United States Patent [19]

Williams

[11] Patent Number: 4,484,743

[45] Date of Patent: Nov. 27, 1984

[54] MOUNTING SYSTEM FOR A VIDEO CONTROL UNIT

[75] Inventor: Fred H. Williams, Minneapolis, Minn.

[73] Assignee: David A. Bartz, Bloomington, Minn.

[21] Appl. No.: 475,191

[22] Filed: Mar. 14, 1983

[51] Int. Cl.³ ............................................. A63B 71/04
[52] U.S. Cl. ........................ 273/148 B; 273/DIG. 30
[58] Field of Search .............. 273/1 R, 148 R, 148 B, 273/309, DIG. 28, DIG. 30

[56] References Cited

U.S. PATENT DOCUMENTS

| | | | |
|---|---|---|---|
| 2,420,673 | 5/1947 | Monrad | 40/518 X |
| 4,040,632 | 8/1977 | Pawl | 273/DIG. 30 |
| 4,422,640 | 12/1983 | Tamarkin | 273/148 R |

Primary Examiner—William H. Grieb
Attorney, Agent, or Firm—Williamson, Bains, Moore & Hansen

[57] ABSTRACT

A video control unit mounting system for mounting a video control unit adjacent an operating surface having a securing means for releasably attaching the video control unit relative to the operating surface and a elastically stretchable video control mounting means having an aperture formed therein for receiving and encompassing the stick of a video control unit. The video control mounting means receives and retains a video control unit between the video control mounting means and the securing means so that movement of the video control unit is greatly inhibited during use.

10 Claims, 3 Drawing Figures

MOUNTING SYSTEM FOR A VIDEO CONTROL UNIT

BACKGROUND OF THE INVENTION

This invention relates to the field of video game equipment and provides a new video control unit mounting system for retention of a video control unit during playing of the game so as to improve the operator's ability to play the game.

In recent years, the home video game industry has steadily expanded, and such games are in widespread use in and out of the home. A typical video game control unit includes an upwardly extending stick which, upon directional movement by the operator, generally produces movement of a character reference symbol portrayed on a video screen. Since the movement of the character symbol should correspond precisely to the directional movement of the stick, it is desirable to retain the video control unit in a stationary position. Even slight movements of the stick caused by inadvertent shifting of the control unit can cause the reference character to move to unwanted positions and mean the difference between success and failure of the operator.

Typically, operation of the control unit requires the use of both of the operator's hands. At times it would be desirable to have a mounting system which would require only use of a single operating hand. Such a system would free the operator's remaining hand so as to relieve some of the tension associated with the game and permit use of the hand for telephone use, eating, drinking and the like.

Since a player can become extremely involved in the play of a video game, it is highly desirable that the harness supporting the video control unit be made so that over-stretching and ripping of the video control mounting harness be avoided.

With the above problems in mind, it is desirable to provide a video control unit mounting system capable of receiving and encompassing the stick of a video control unit in a relatively stationary position adjacent an operating surface so that external forces on the stick do not move the character reference of the video game to unwanted positions.

It has also been found desirable to provide a video control unit mounting system which is compact, easily and economically manufactured and which preferably folds to a flat configuration for easy storage.

The present invention is directed toward solving these problems and provides a workable and economic solution to them.

SUMMARY OF THE INVENTION

A video control unit mounting system allows a video control unit to be retained adjacent an operating surface and includes a video control unit having an upwardly extending stick for manipulative control. The video control unit is snugly engaged between a securing strap and a video control mounting strap by means of a high coefficient of friction material of the video control mounting strap contacting the video control unit so that the video control unit remains relatively stationary between the securing strap and the video control mounting strap during play. The video control strap is also made of a substantially elastically flexing material permitting stretching along its own length so that the video control strap may tightly encompass the video control unit. The video control strap includes an aperture formed therein for receiving and encompassing the stick of the video control unit and also includes restraining fibers contained therein so as to inhibit over-stretching and ripping of the video control mounting strap during rigorous use. The securing strap includes a pair of Velcro material members which may be selectively interlocked thereby securely retaining the securing strap about an operating surface and also retaining the video control unit adjacent the operating surface.

Other objects and advantages of the invention will become apparent from the following detailed description and from the appended drawings in which like numbers have been used to describe like parts of the several views.

DESCRIPTION OF THE PREFERRED EMBODIMENT

Figure 1:
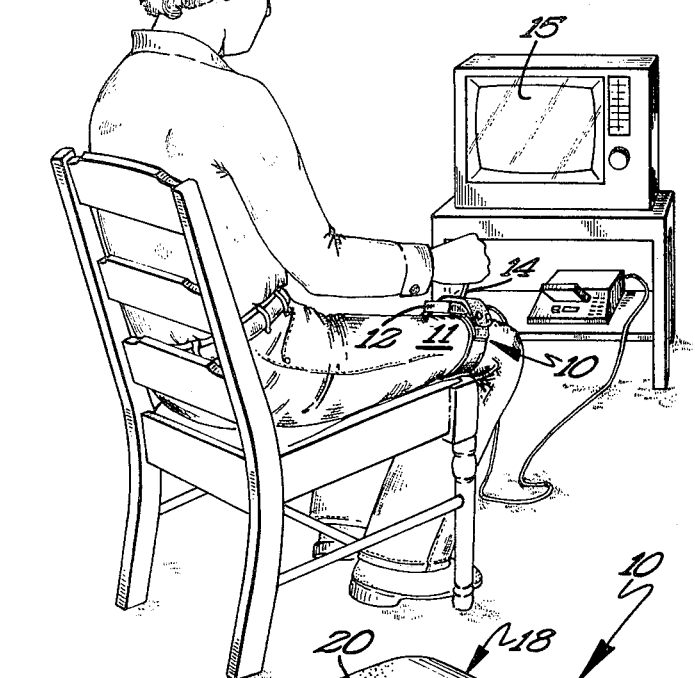
FIG. 1 is a perspective view of an embodiment of the video control unit mounting system showing it in use.

Referring now to FIG. 1, a video control mounting system 10 is retained about an operating surface 11 so that a video control unit 12 may be retained in a relatively stationary position adjacent the operating surface 11. The operating surface 11 may be the operator's limb or a variety of surfaces, such as a chair's arm. The video control unit 12 includes a stick 14 which provides for directional control of character reference symbols on a video screen 15.

Figure 2:
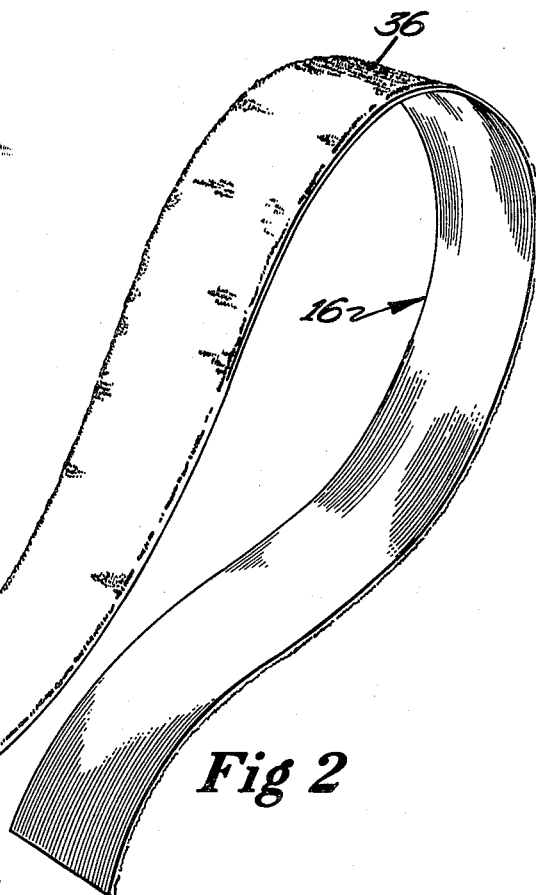
FIG. 2 is an exploded view of the embodiment shown in FIG. 1.
Figure 3:
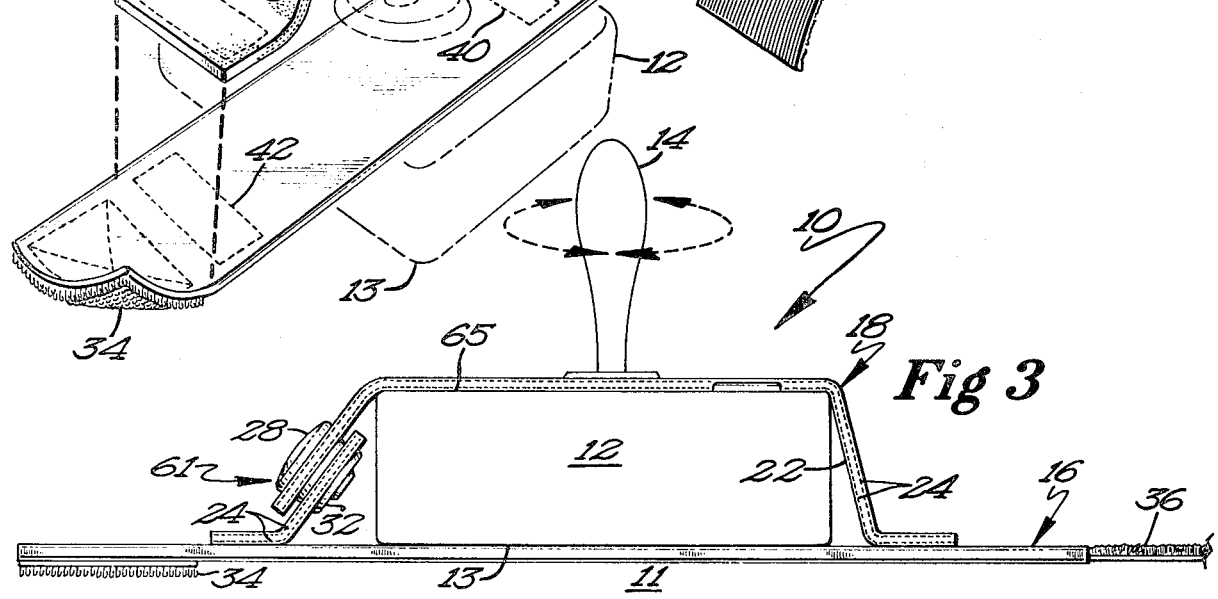
FIG. 3 is a side elevation view of the mounting system shown in FIG. 1.

As best shown in FIGS. 2 and 3, a securing strap 16 having a pair of Velcro material members 34 and 36 is wrapped about the operating surface 11 and provides a securing means for releasably attaching the video control mounting system 10 about the operating surface 11. The pair of Velcro material members 34 and 36 which may be selectively interlocked or disengaged by the operator firmly secure the securing strap 16 about the operating surface 11.

Mounted to the securing strap 16 at stitch points 40 and 42 is a video control mounting strap 18. The video control mounting strap 18 contains an aperture 20 formed therein, and provides for a video control mounting means. The video control mounting strap 18 also includes a pair of snap fasteners 26 and 28, and a pair of snap connectors 30 and 32 which provide for a fastening means allowing the video control unit 12 to be inserted or removed from between the securing strap 16 and the video control mounting strap 18.

The mounting strap 18 is made of a substantially elastically flexing material which permits stretching of the mounting strap 18 along its own length. The substantially elastically flexing material of the mounting strap 18 also permits the video control unit 12 to be tightly retained between the securing strap 16 and the mounting strap 18 as the substantially elastically material of the mounting strap 18 allows the mounting strap 18 to conform to the configuration of the video control unit 12. The substantially elastically flexing material permitting stretching of the mounting strap 18 along its own length also inhibits stretching transversely across the mounting strap 18 thereby preventing horizontal tilting of the mounting strap 18 while the stick 14 is maneuvered by the operator so that movement of a character reference corresponds precisely to the directional movement of the stick 14.

The mounting strap 18 also includes an aperture 20 formed therein which is capable of receiving and encompassing the upwardly extending stick 14 of the video control unit 12. The mounting strap 18 further includes restraining fibers 24, as best shown in FIG. 3, contained within the mounting strap 18 which prevents overstretching and ripping of the mounting strap 18 during rigorous use. The operator's enthusiasm in maneuvering the stick 14 can sometimes cause intense forces to build up within strap 18. The restraining fibers 24 counterbalance these forces so that the mounting strap 18 does not receive forces greater than or equal to the force needed to rip the mounting strap 18 during normal rigorous use.

The video control mounting strap 18 also includes a high coefficient of friction material 22 which inhibits sliding of the video control unit 12 during use. The high coefficient of friction material surface 22 of the mounting strap 18 cooperates with the substantially elastically flexing material of the mounting strap 18 to conform the mounting strap 18 to the configuration of the video control unit 12 thereby tightly retaining the video control unit 12 and preventing sliding of the unit 12 during use.

In operation, the securing strap 16 is wrapped around the operating surface 11 and is secured tightly about the surface 11 by means of a pair of Velcro material members 34 and 36 which may be selectively interlocked or disengaged by the operator.

When the pair of snap fasteners 26 and 28 and a pair of snap connectors 30 and 32 are in an unfastened position 60 the base 13 of the video control unit 12 is placed along the securing strap 16 thereby positioning the unit 12 between the securing strap 16 and mounting strap 18. The stick 14 of the video control unit 12 is placed through the aperture 20 of the mounting strap.

Once the video control unit 12 is aligned sufficiently between the securing strap 16 and the mounting strap 18 with the stick 14 protruding outwardly through aperture 20, the snap fasteners 26 and 28 are engaged with the snap connectors 30 and 32, respectively. In the fastened position 61, the substantially elastically flexing material of the mounting strap 18 allows the strap 18 to conform to the configuration of the video control unit 12 and thereby tightly frictionally engage and retain the video control unit 12 between the securing strap 16 and the video control mounting strap 18. In the fastened position 61, the high coefficient of friction material surface 22 of the mounting strap 18 closely abuts and engages the outer periphery 65 of the video control unit 12 during use so as to prevent slippage of the unit 12 during even intense manipulation of stick 14.

After use, the video control unit 12 may be conveniently removed from the video control mounting system 10 by unfastening the snap fasteners 26 and 28 from the snap connectors 30 and 32, respectively, and subsequently removing the unit 12. The video control mounting system 10 in its unfastened state also provides for easy storage, as the system 10 forms into a flat arrangement.

While the preferred embodiments of the present invention have been described, it should be understood that various changes, adaptions and modifications may be made therein without departing from the spirit of the invention and the scope of the appended claims.

What is claimed is:

1. A video control unit mounting system for mounting a video control unit adjacent an operating surface comprising:
   a video control unit having a stick for manipulative control;
   a securing means for releasably attaching said video control unit relative to the operating surface; and
   a video control mounting means secured to said securing means and having an aperture formed therein capable of receiving and encompassing said stick, said video control mounting means being capable of receiving and retaining said video control unit between said securing means and video control mounting means so that movement of said video control unit is inhibited during use.

2. The video control unit mounting system of claim 1 wherein:
   said video control mounting means is made of a substantially elastically flexing material permitting stretching along its own length so that said video control unit is tightly retained between said securing means and said mounting means and movement of said video control unit is inhibited during use.

3. The video control unit mounting system of claim 2 wherein:
   said video control mounting means includes a high coefficient of friction material surface, said high coefficient of friction material surface contacting said video control unit and cooperating with said substantially elastically flexing material of said mounting means to tightly retain said video control unit between said securing means and said mounting means so that movement of said video control unit is inhibited during use.

4. The video control unit mounting system of claim 1 wherein:
   said video control mounting means includes restraining fibers contained therein so as to inhibit overstretching and rippage of said mounting means during use.

5. The video control unit mounting system of claim 1 wherein:
   said video control mounting means includes a fastening means for inserting and retaining said video control unit between said securing means and said video control mounting means.

6. The video control unit mounting system of claim 1 wherein:
   said securing means includes a pair of Velcro material members which may be selectively interlocked to securely retain said video control unit relative to the operating surface.

7. The video control unit mounting system for mounting a video control unit adjacent an operating surface comprising:
   a video control unit having a stick for manipulative control;
   a securing means for releasably attaching said video control unit relative to the operating surface, said securing means including a pair of Velcro material members which may be selectively interlocked to securely retain said video control unit relative to the operating surface; and
   a video control mounting means secured to said securing means and having an aperture formed therein capable of receiving and encompassing said stick, said video control mounting means being made of a substantially elastically flexing material permitting stretching along its own length, said mounting means also including a high coefficient of friction material surface contacting said video control unit and cooperating with said substantially elastically flexing material of said mounting means to tightly retain said video control unit between said securing means and said mounting means so that movement of said video control unit is inhibited during use.

8. The video control unit mounting system of claim 7 wherein:
said video control mounting means including restraining fibers contained therein so as to inhibit overstretching and rippage of said mounting means during use.

9. A video control unit mounting and retention system capable of mounting a stick-equipped video control unit relative to an operating surface comprising:
a securing means for releasably attaching the video control unit relative to the operating surface, said securing means including a pair of Velcro material members which may be selectively interlocked to securely retain said video control unit relative to the operating surface; and
a video control mounting means secured to said securing means and having an aperture formed therein capable of receiving and encompassing the video control stick, said mounting means being made of a substantially elastically flexing material permitting stretching along its own length, said mounting means also including a high coefficient of friction material surface contacting the video control unit and cooperating with said substantially elastically flexing material of said mounting means to tightly retain the video control unit between said securing means and said mounting means so that movement of said video control unit is inhibited during use.

10. The video control unit mounting and retaining system of claim 9 wherein:
said video control mounting means including restraining fibers contained therein so that overstretching and rippage of said mounting means are inhibited during use.

* * * * *